L. S. LACHMAN.
SPOT WELDING ELECTRODE.
APPLICATION FILED JULY 19, 1918.
1,303,919.
Patented May 20, 1919.
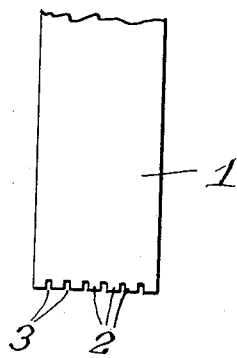
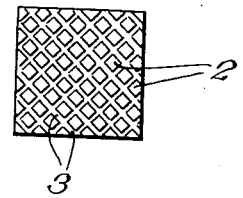
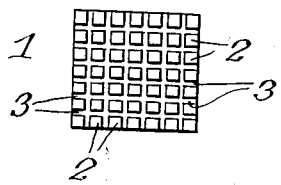
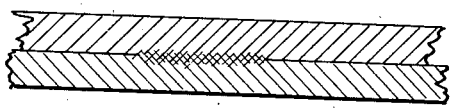
INVENTOR
Lawrence S. Lachman
BY
Townsend & Decker
ATTORNEYS

UNITED STATES PATENT OFFICE.

LAURENCE S. LACHMAN, OF NEW YORK, N. Y., ASSIGNOR TO UNIVERSAL ELECTRIC WELDING COMPANY, OF NEW YORK, N. Y., A CORPORATION OF NEW YORK.

SPOT-WELDING ELECTRODE.

1,303,919.     Specification of Letters Patent.     Patented May 20, 1919.

Application filed July 19, 1918. Serial No. 245,627.

*To all whom it may concern:*

Be it known that I, LAURENCE S. LACHMAN, a citizen of the United States, and a resident of New York, in the county of New York and State of New York, have invented certain new and useful Improvements in Spot-Welding Electrodes, of which the following is a specification.

My present invention relates to electrodes for spot welding and particularly to the formation of the work engaging face thereof.

The invention pertains to that class of welding called electric spot welding, to wit, wherein the contact of the end of an electrode with the work serves to concentrate both the flow of current and the application of pressure at the spot at which the work is desired to be welded. This art is now well known and widely practised in the metal trades.

In spot welding the area of the electrode contacting with the work determines the size of the weld and when a large area weld is desired for strength, the work contacting end of the electrode is made very large which requires an exceedingly large volume of current to bring the work up to the welding temperature. Also such a large mass of the electrode contacting with the heated section of the work tends to carry off the heat from the heated section.

The object of this invention is to attain a large area spot weld without enormous current consumption. It is also the object to quicken the welding operation and make a more effective weld between the pieces to be joined.

The invention consists in the spot welding electrode hereinafter more particularly described and then specified in the claims.

In the accompanying drawings, Figure 1 is a side elevation of a spot welding electrode constructed in accordance with this invention.

Fig. 2 is a plan view of the work engaging face of the same.

Fig. 3 is a cross-section through two plates of metal indicating the spot weld which results from the use of the electrode shown in Figs. 1 and 2.

Fig. 4 is a plan view showing an alternate arrangement of work engaging face for the electrode.

1 indicates a bar of good conducting material such as copper and which in cross-section may be square, round or of any other desired shape. The bar 1 forms the electrode connected to one terminal of the secondary of an electric transformer such as used in electric welding operations and as well understood in the art.

The end of the electrode preferably makes flat contact with the plates to be spot welded; this contact in accordance with the previous practice being made continuous over the whole area of the end of the electrode. In the present case however the end of the electrode is serrated to form a multiplicity of preferably small projections 2 spaced apart by intersecting fine grooves 3 cut or otherwise formed in the face of the electrode 1. These grooves may be disposed in various ways, one arrangement being shown in Fig. 2 and another in Fig. 4. The grooves are preferably of very slight width and may be of any desired depth, the object being to isolate portions of the work-contacting face of the electrode and at the same time have them so near together that they coact together and form a single area of weld in the plates to be joined.

The lower or companion electrode forming the other terminal of the transformer secondary and which usually engages the work opposite the electrode 1 may have its work engaging surface similarly prepared or it may if desired be smooth.

The welding operation will be well understood to all those skilled in the art. The serrated end of the electrode 1 being brought into engagement with the outer surface of the plates to be united makes initial contact with the plate at a number of small, slightly separated places and the current flows only across such places of contact thereby requiring considerably less volume of current than if a continuous flat contact was made over the whole of the area of the end of the electrode. The gap between the projections being very small, the heat generated in the plates due to the passage of the current in line with the projections 2 also softens the metal spanned by the grooves 3 and upon the application of pressure the whole mass bounded by the periphery of the electrode is commingled with a single spot weld of large area as indicated at 5 Fig. 3 in which 6 and 7 indicate the plates to be joined.

Also by breaking the continuity of the contact area of the electrode with the work the volume of metal of the electrode available for carrying heat away from the work is reduced.

What I claim as my invention is:

1. A spot welding electrode having a serrated work-contacting face adapted to form a single weld in the work.

2. A spot welding electrode having a plurality of intersecting grooves in the work-contacting face.

3. A spot welding electrode having a plurality of fine grooves intersecting each other whereby a multiplicity of slightly separated projections are provided in the work-engaging face.

4. A spot welding electrode provided with a plurality of slightly separated work-engaging projections adapted to co-act together to form a single spot weld in the work.

Signed at New York, in the county of New York and State of New York, this 18th day of July, A. D. 1918.

LAURENCE S. LACHMAN.

Witnesses:
F. B. TOWNSEND,
F. E. KOESLER.